United States Patent
Cohen

(10) Patent No.: US 9,767,925 B2
(45) Date of Patent: Sep. 19, 2017

(54) METHOD, APPARATUS, AND SYSTEM TO REDUCE NEUTRON PRODUCTION IN SMALL CLEAN FUSION REACTORS

(71) Applicant: THE TRUSTEES OF PRINCETON UNIVERSITY, Princeton, NJ (US)

(72) Inventor: Samuel A. Cohen, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 289 days.

(21) Appl. No.: 14/387,475

(22) PCT Filed: Mar. 25, 2013

(86) PCT No.: PCT/US2013/033767
§ 371 (c)(1),
(2) Date: Sep. 23, 2014

(87) PCT Pub. No.: WO2013/191779
PCT Pub. Date: Dec. 27, 2013

(65) Prior Publication Data
US 2015/0294742 A1 Oct. 15, 2015

Related U.S. Application Data

(60) Provisional application No. 61/615,048, filed on Mar. 23, 2012.

(51) Int. Cl.
*G21B 1/05* (2006.01)
(52) U.S. Cl.
CPC ............ *G21B 1/052* (2013.01); *Y02E 30/122* (2013.01)
(58) Field of Classification Search
CPC .............................. G21B 1/052; Y02E 30/122
(Continued)

(56) References Cited

U.S. PATENT DOCUMENTS

| 4,065,351 A | 12/1977 | Jassby et al. |
| 4,749,540 A * | 6/1988 | Bogart ..................... G21B 1/11 376/146 |

(Continued)

FOREIGN PATENT DOCUMENTS

WO 2006096772 A2 9/2006

OTHER PUBLICATIONS

Glasser, "Ion and electron acceleration in the field-reversed configuration with an odd-parity rotating magnetic field", Phys. Plasmas, vol. 9, No. 5, May 2002, pp. 2093-2102.*

(Continued)

*Primary Examiner* — Jack W Keith
*Assistant Examiner* — Daniel Wasil
(74) *Attorney, Agent, or Firm* — Fox Rothschild LLP

(57) ABSTRACT

The invention is for a system and method to reduce neutron production from a deuterium-helium-3 (D-$^3$He) fueled, steady-state, small nuclear fusion reactor. The reactor employs a field-reversed configuration (FRC) magnetic confinement scheme and an odd-parity rotating magnetic field (RMF$_o$) that produces periodic, co-streaming, energetic ion beams which heat the plasma. This is accomplished through radio-frequency (RF) heating, which can effectively heat and maintain the plasma. Use of this method will lessen damage to and activation of reactor components and, in doing so, can advance the development of fusion reactors for electrical, power and propulsion applications by alleviating the need for both nuclear-materials and tritium-breeding-technology testing programs.

3 Claims, 3 Drawing Sheets

(58) Field of Classification Search
USPC .................. 376/123, 128, 142, 146, 147; 315/111.41, 111.71
See application file for complete search history.

(56) References Cited

U.S. PATENT DOCUMENTS

| | | |
|---|---|---|
| 6,611,106 B2 | 8/2003 | Monkhorst et al. |
| 7,015,646 B2 | 3/2006 | Rostoker et al. |
| 7,126,284 B2 | 10/2006 | Rostoker et al. |
| 9,025,717 B2 * | 5/2015 | Freeze .................. G21B 1/05 376/133 |
| 9,082,516 B2 * | 7/2015 | Slough .................. G21B 1/052 |
| 2006/0198485 A1 | 9/2006 | Binderbauer |
| 2006/0267504 A1 * | 11/2006 | VanDrie ................ G21B 1/052 315/111.41 |
| 2008/0095293 A1 | 4/2008 | Hacsi |

OTHER PUBLICATIONS

Cohen et al., "Formation of collisionless high-b plasmas by odd-parity rotating magnetic fields," The American Physical Society (Apr. 6, 2007):98:145002-a-145002-4.

Glasser et al., "Ion and electron acceleration in the field-reversed configuration with an odd-parity rotating magnetic field," Physics of Plasmas (May 2002); 9(5):2093-2102.

\* cited by examiner

METHOD, APPARATUS, AND SYSTEM TO REDUCE NEUTRON PRODUCTION IN SMALL CLEAN FUSION REACTORS

CROSS REFERENCE TO RELATED APPLICATIONS

This application is the U.S. National Phase of International Application No. PCT/US2013/033767, filed Mar. 25, 2013, which claims priority to U.S. Provisional Patent Application No. 61/615,048, filed Mar. 23, 2012. The contents of the foregoing applications are incorporated herein by reference in their entireties.

FIELD OF THE INVENTION

The disclosed scenarios relates generally to the field of plasma physics and, in particular, to methods and apparati for confining plasma to facilitate nuclear fusion for the purpose of producing power.

BACKGROUND

Nuclear fusion reactors have been proposed to produce electrical power from the fusion of atomic particles such as deuterium, tritium, and helium.

Generally, in fusion, light nuclei bind to produce fast moving, heavy particles, which contain vast quantities of energy. This process only occurs at temperatures of hundreds to thousands of million Kelvin such that the Coulomb force, which repulses the positively charged nuclei, is overcome. Reactivity, or the rate of fusion, is a function of temperature.

The most important fusion reactions for practical reactors are as follows.

$$D+T \rightarrow \alpha(3.6 \text{ MeV}) + n(14.1 \text{ MeV}), \quad \text{(Equation 1)}$$

$$D+{}^3He \rightarrow {}^4He(3.7 \text{ MeV}) + p(14.7 \text{ MeV}), \text{ and} \quad \text{(Equation 2)}$$

$$D+D \rightarrow {}^3He(0.8 \text{ MeV}) + n(2.5 \text{ MeV}), \quad \text{(Equation 3)}$$

where D is deuterium, T is tritium, $\alpha$ is a helium nucleus, n is a neutron, p is a proton, and $^3$He and $^4$He are helium-3 and helium-4, respectively. The associated kinetic energy of each product is indicated in parentheses.

The D-T reaction produces most of its energy in neutrons, which means that electrical energy can only be produced by using the neutron radiation to heat a working fluid, mach like in a fission reactor. Due to temperature limitations, that conversion can only be about 30% efficient. An advantage of the D-T fuel mixture is that it produces net power at the lowest temperatures, of only 5-10 keV (1 keV=11.6 million K, and is a more convenient unit of temperature). However, the energetic neutrons liberated in this reaction represent a significant threat to the reactor's structure as the neutron flux degrades the electrical, mechanicals and thermal properties of the reactor components and also leaves many of their materials radioactive. Some of these energetic neutrons can be used to breed tritium, a scarce material. Thus, the D-T fuel mixture poses significant challenges with radiation damage, material activation, and fuel availability. Pursuing a D-T reactor would require substantial research and development of nuclear materials and tritium breeding as well as several meters worth of shielding to protect reactor components and personnel from neutron radiation.

The D-D fusion reactions are very attractive because the abundance of deuterium obviates the need to breed tritium. Moreover, the neutrons generated are fewer in number and lower in energy than from D-T per unit of energy produced. By selective treatment of D-D fusion's daughter products—removing the T from the plasma before it fuses but burning the prompt and decay-formed $^3$He, a technique called He-catalyzed D-D fusion—the neutron production can be reduced to 7% of the D-T level, per unit of energy produced.

The D-$^3$He reaction termed aneutronic, as it produces relatively few neutrons and requires none for breeding. The energy from the charged reaction products can be directly converted to electrical power at a much higher efficiency than D-T. However, higher temperatures, of 50-100 keV, are required to achieve the same reactivity as D-T. Both reactions admit D-D side reactions, which for a D-$^3$He reactor is the only source of neutron production. A known method for decreasing this neutron generation is lowering the reactant concentration ratio of D:$^3$He from 1:1 to 1:9. In a thermal plasma with 100 keV ion temperatures, this causes neutron production to drop from 2.6% to 0.5% of D-T's per unit of energy produced. This reduces the level of neutron shielding required to under a meter. However, the lower D concentration reduces the power density by a factor of 4.5, adversely affecting the economics.

Another highly appealing aneutronic fuel is proton-boron-11 (p-$^{11}$B), however, many doubt its viability because at the plasma temperatures required for p-$^{11}$B fusion, over 200 keV, the fusion power generated is calculated to be less than the power required to sustain the high plasma temperature.

In addition to a fuel source, fusion reactors must incorporate a heating process, confinement method, and energy conversion system.

Fusion reactors can be broadly classified as those that use magnetic confinement and those that use inertial confinement. In the former, magnetic fields from external coils or produced by plasma currents confine hot plasma, allowing for fusion to occur. In inertial confinement, by contrast, external particle beams or lasers compress the reactants to produce fusion.

Dozens of magnetic geometries that have been proposed for fusion reactors. While the tokamak is the most widely used configuration, other topologies include stellarators, dipoles, theta-pinch, magnetic mirrors, and field-reversed configurations. A critical parameter for comparing these geometries is $\beta$, the ratio of magnetic pressure to plasma pressure. The stellarators and tokamaks are low-$\beta$ devices, meaning that larger, heavier, and more expensive magnetic coils are needed. Field-reversed configurations and dipoles have $\beta$'s closer to unity, making them cheaper and less complex. A high $\beta$ is crucial for burning aneutronic fuels since they require such high temperatures and pressures.

The International Thermonuclear Experimental Reactor (ITER) is the culmination of current tokamak research. It is designed to burn D-T and requires plasma temperatures of 10-30 keV. It uses injection of energetic beams for plasma heating and requires a minimum plasma dimension of 2.8 meters. ITER's total dimensions are 30 meters in height with a 30 meter diameter. It converts the highly energetic neutrons to electricity and is therefore prone to radiation damage and a maximum efficiency of 30%. However, aneutronic D-$^3$He would require an even larger tokamak-type reactor to achieve the required plasma temperatures.

Thus, plasma heating methods are a critical consideration for reactor design. Colliding beams, induced currents, and radio waves, have all been proposed for plasma heating and are used in experimental devices.

The use of colliding beams for heating a toroidal reactor is disclosed by Jassby (U.S. Pat. No. 4,065,351). This proves infeasible for advanced aneutronic fuels, such as D-$^3$He.

Hacsi (U.S. Paten Application Publication No. 2008/0095293) discloses a C-Pinch geometry for a thermonuclear fusion device. A plasma-ring generator is provided where a multitude of capacitors discharge across arc-points arranged in a circular or other configuration to cause a plasma-ring or plasma-structure with a circulating electric current to be formed. This provides a novel method of heating a plasma but does not solve the inherent plasma confinement issues.

Monkhorst et al (U.S. Pat. No. 6,611,106) discloses a plasma-electric power generation system for direct conversion of fusion product energy to electric power. Plasma ions are magnetically confined in the FRC while the plasma's electrons are electrostatically confined in a deep energy well, created by tuning an externally applied magnetic field. In this configuration, the ions must have adequate densities and temperatures so that upon collision they are fused together by the nuclear force, thus forming fusion products that emerge in the form of an annular beam. Energy is removed from the fusion product ions as they spiral past electrodes of an inverse cyclotron converter.

Rostoker et al. (U.S. Pat. No. 7,015,646) and Rostoker et al. (U.S. Pat. No. 7,126,284) disclose a system and method for containing plasma and forming a field-reversed configuration (FRC) magnetic topology in which plasma ions are contained magnetically in stable, non-adiabatic orbits in the FRC. As in Monkhorst, the electrons are contained electrostatically in a deep energy well, created by tuning an externally applied magnetic field. The simultaneous electrostatic confinement of electrons and magnetic confinement of ions avoids anomalous transport and facilitates classical containment of both electrons and ions. Moreover, the fusion fuel plasmas that can be used with this confinement system and method are not limited to neutronic fuels only, but also advantageously include advanced fuels.

Rostoker '646, Rostoker '284 and Monkhorst disclose a method that combines electrostatic and magnetic confinement. While a confinement method is illustrated in detail, a heating method is not proposed.

The cited patents do not address the practical issues of plasma heating and stable confinement within a small-size FRC reactor for burning aneutronic fuel. Other FRCs lack proven methods to heat electrons and drive plasma currents. Rotating magnetic fields (RMF), powered by RF, can heat small plasmas. However, the even-parity configuration (RMF$_e$, Rotating Magnetic Field, even-parity) has been shown to have poor energy confinement resulting in the need for a larger FRC.

SUMMARY

An improved field reversed magnetic field configuration fusion reactor system is disclosed. The reactor system includes a reactor chamber, and a gas injection system for injecting fuel into the reactor chamber for fusion reactions. A plurality of radio frequency (RF) antennae are configured to generate an odd-parity rotating magnetic field capable of heating the fuel to a temperature sufficient to cause a plasma of fuel ions to fuse. The magnetic field that includes an open field region and a closed field region and a toroidal current is generated within the plasma around a null line, at which the magnitude of the magnetic field is zero. Superconducting flux coils around the reactor chamber in which a current is induced the odd-parity rotating magnetic field. The induced current generates a confinement field that confines the plasma. A direct energy conversion system that extracts energy from a plurality of products from fusion reactions in the plasma. Alternatively, an indirect energy conversion system may also be deployed.

A method for generating power from a field reversed magnetic field configuration fusion reactor system is disclosed. The method includes injecting ionized fuel plasma into a plasma chamber. Radio frequency antennae generate an odd-parity rotating, magnetic field that heats the plasma by producing, in the plasma, periodic co-streaming ion beams. The effects of the odd-parity rotating magnetic field heat the plasma sufficiently to cause the ionized fuel to under go fusion reactions. The energy of the products of the fusion reactions are directly and/or indirectly converted into electricity.

DETAILED DESCRIPTION

Figure 1:
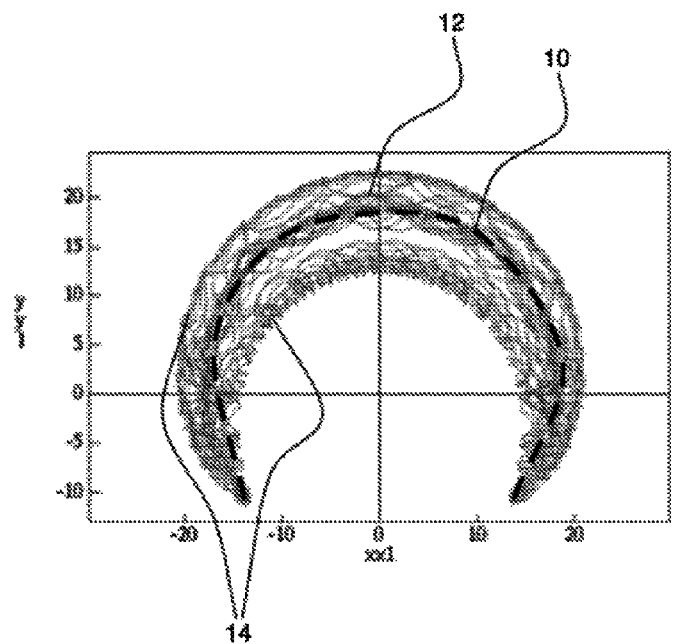
FIG. 1 is a simulation of D$^+$ trajectories viewed in the frame-of-reference of the RMF$_o$.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the disclosed scenarios. Furthermore, reference in the specification to "one embodiment" or "an embodiment" means that as particular feature, structure or characteristic described in connection with the embodiment is included in at least one embodiment of the invention. The appearances of the phrase "in an embodiment" in various places in the specification are not necessarily all referring to the same embodiment.

During the course of this description like numbers will be used to identify like elements according to the different views, which illustrate the invention.

The disclosed scenarios decreases neutron production in D-$^3$He-fueled FRC while improving power density. The disclosed scenarios embraces a more stable alternative to convention FRC systems and can reduce neutron production of D-$^3$He plasmas below 1%, while maintaining a higher D:$^3$He ratio, hence higher power density. It relies on odd-parity RMF (RMF$_o$) heating to generate periodic, beam-like, high-energy ion energy distributions in a steady state FRC device.

For an FRC reactor to burn its D-$^3$He fuel mixture, the plasma ions must be heated to over 50 keV. If energetic neutral-beam injection were used for heating, the plasma would have to be over 4 meters in diameter in order to absorb the energy of the neutral beams. Such a large reactor would produce power in the range of 1 GW. With RF heating, on the other hand, power can be absorbed over shorter distances. RF heating allows the size of the reactor to be reduced by about a factor of 100 in volume and 10 in radius, to 0.5 m in diameter. A smaller volume translates to a proportionally lower power, near 10 MW, suitable for compact power systems.

A field-reversed configuration is produced in a cylindrical vessel by the following means. An axial magnetic field is applied to the plasma creating azimuthal electric currents in the ionized gas. These currents then serve to support the magnetic field itself. The direction of the applied field is then reversed. The currents in the ionized gas continue to maintain the original magnetic field within a region around the center of the plasma, and the magnetic field lines "heal" themselves into a self-consistent configuration. The result is a spheriodal-shaped region within the plasma whose magnetic field is in a direction opposite, or reversed, relative to the applied field.

Energetic Ion Beams

Fusion reaction cross sections, $\sigma_{ij}$, depend on the relative velocity or center-of-mass (CM) energy, $E_{CM}$, of the colliding nuclei, species i and j. In a thermal plasma of temperature $T_{th}$, collisions occur with an average CM energy comparable to $T_{th}$. For D-T, most fusion events arise from particles with energy near 6 $T_{th}$. For thermal plasmas, the energy-averaged fusion reaction rates, $<\sigma v>_{ij}$, peak at different temperatures for each fuel mixture: near 60 keV for D-T, 250 keV for D-$^3$He, 600 keV for p-$^{11}$B, and 1 MeV for D-D. However, because the fusion power $P_f \sim n^2 <\sigma v>_{ij}$ while $\beta \sim nT/B^2$, a fusion-device-specific limit on $\beta$ causes the maximum $P_f$ for thermal plasmas to be produced at temperatures where $<\sigma v>_{ij} \sim T^2$, i.e. considerably below the peak, $T_p$. The same equations show that $P_f \sim \beta^2 B^4$ and a strong benefit accrues from higher $\beta$ and B.

Figure 2:
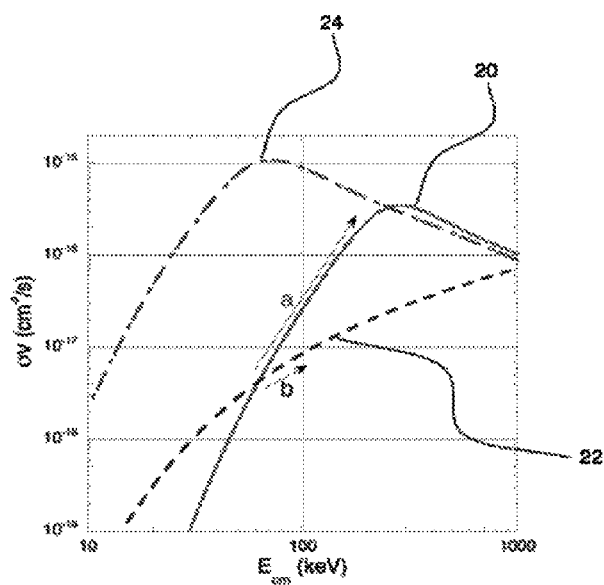
FIG. 2 shows the reactivity of fusible pairs versus center-of-mass energy.

It has long been appreciated that the plasma-parameter requirements for net fusion power gain could be relaxed by promoting beam-target interactions, that is, forming a plasma with a fraction of one reacting species having a high, nearly monoenergetic energy $E_b$ near the peak of reactivity while the other species is relatively stationary. Both beam-like, that is, collimated, and isotropic velocity distributions with energy $E_b$ were considered. For energetic beam-like distributions, particle pairs in the beam have a low CM energy, characterized by transverse temperature $T_\perp \ll E_b$; fusion reactions within a beam are infrequent. However, if the beam encounters an oppositely directed beam or a nearly static ensemble of a fusible species, increasing fusion power could be produced if $E_b$ was raised towards the $\sigma v$ peak at $E_p$. Fusion reaction rates versus CM energy—not versus temperature—are shown in FIG. 2 for three fusible pairs. Below the peak, the D-T 24 and D-$^3$He 20 pairs show strong increases in rate with $E_{CM}$, far stronger than D-D 22 shows. In the range $0.2E_p < E < 0.8E_p$, $\sigma v$ grows $\sim E_{CM}^4$ for D-T 24 and D-$^3$He 20, and higher fusion power is possible in a two-component plasma constrained by $\beta$.

Beam particles passing through plasma lose energy to both the plasma's electrons and ions. A beam formed by injection of energetic particles will continually lose energy and only transiently be near the peak in $\sigma v$. Quantitatively, the fusion probability of a beam particle as it slows down from an injection energy near $E_p$ to the bulk plasma temperature is about 1% or less. A slow, though adiabatic, plasma compression may be a one-time means to compensate for the beam losing energy to the bulk plasma. To reduce the beam's energy loss to plasma electrons to an acceptable level requires a minimum electron temperature, $T_e > E_b/20 \sim 30$ keV for a 600 keV D beam circulating in a $^3$He plasma.

The $\beta$ limit requires the beam density, $n_b$, to be considerably lower than the bulk plasma density, $n_e$. Plasmas with $n_b E_b \sim n_e (T_e + T_i)$, where $T_i$ is the ion temperature of the bulk plasma, have sufficiently improved power production that the fusion events produced by the beam would generate more energy than was necessary to produce the beam and sustain the plasma.

A neutral-beam-heated D-T-fueled tokamak operated with compression seemed ideally suited to demonstrate beam-enhanced fusion-power production. We assert that important improvements can be gained in the two-component concept by changing several of their choices: from beam heating to RF heating, from D-T to D-$^3$He fuel, from a single compression to a rapid, periodic, RF acceleration-deceleration, and from the tokamak geometry to the FRC geometry.

The overarching improvement we seek is a sizeable decrease in neutron production while maintaining net power production at a power density comparable to or in excess of D-T's. The choice of D-$^3$He as fuel eliminates the need for neutrons to breed tritium and, in doing so, eliminates the need for extensive and lengthy R&D programs for nuclear-materials testing and tritium breeding and would also alleviate reactor-siting restrictions associated with radioactivity.

Though D-$^3$He has a 10-times lower $<\sigma v>$ than D-T at the same plasma temperature, the same or higher fusion power density can be achieved because the 10-fold higher $\beta$ of the FRC compared to the tokamak allows higher plasma temperature at the same plasma density or higher density at the same temperature. Additionally, with the same magnet technology, a 50% higher magnetic field strength is possible in the linear FRC than in the donut-shaped tokamak.

As describe below, the advantage gained by the approach in the disclosed scenarios arises from the novel RF plasma-heating technique's ability to produce in the plasma, in steady-state, periodic, collimated co-propagating on beams of the two species with different peak energy for each species. $D^+$ ions will have half the peak energy as $^3$He$^{+2}$ ions. The CM energy between the two beams will be near $E_p/3$ and the time-averaged beam densities near $n_e/10$. This will reduce the D-D fusion rate by lowering the D's effective temperature to $T_\perp$ but raise the D-$^3$He fusion rate above the value estimated for a temperature based on the average energy, $E_{av}$.

Rider (4 Physics of Plasmas 1039, 1997) pointed out that the large ratio of the 90 Coulomb-Spitzer scattering to fusion cross-sections made it difficult to maintain different ion temperatures for each ion species. Below an explanation of how the novel RF applied to an FRC causes a periodic acceleration then deceleration of each ion, is presented. This is the highly efficient recirculation of power suggested by Rider to remedy this criticism.

Rf-Created Ion Beams in an FRC

Ion heating by $RMF_o$ is highest near the O-point null line 10, near the center of the plasma's magnetic axis, where it creates a time-varying azimuthal electric field. This periodically accelerates ions into betatron orbits 12 and then decelerates them back into cyclotron orbits 14. Choosing the $RM_{Fo}$'s $\omega_{RMF}$ and amplitude properly allows ions to be pumped up, repeatedly, to energies near the peak in the D-$^3$He fusion cross-section and then returned to the bulk temperature. This is a conservative process and satisfies the recirculating energy criterion derived by Rider, described below. In a D-$^3$He plasma, the trajectories of $RMF_o$-accelerated ions are predicted to form two betatron orbit streams close to the FRC's O-point null line 10: a D stream 12 and an $^3$He stream. The deuterium stream ions have half the peak energy of the $^3$He ions, causing non-zero relative velocity between them. The transverse temperature of each beam is considerably lower than the beam's peak energy, hence deuterium ions collide with each other at a far lower center of mass energy than with $^3$He; accordingly, the D-D neutron production rate falls and $f_p$ is reduced.

Further reductions can be gained from the differential in the energy-dependent fusion rates. In a scenario, the bulk plasma has an average energy of 70 keV and the RMF$_o$ increases the $^3$He by about 100 keV 20,*a* then it will increase the D$^+$ by about 50 keV 22,*b* and D-T reactivity will be suppressed 24. Thus, several effects—centrally peaked betatron orbits, low transverse beam temperature, reduced D-to-$^3$He ratio, and higher $^3$He energy—combine to decrease $f_p$ below 0.2% for a RMF$_o$-heated D-$^3$He-fueled FRC.

Add to these effects that D-$^3$He fusion produces neutrons that have only one-sixth of the energy of those produced by burning D-T and the larger surface to volume ratio ($\propto 1/$radius) for a small FRC compared to a large tokamak (25 cm vs. 10 m) and an additional 240-fold reduction of neutron power load on the wall is obtained. Overall, the shielding requirements for the disclosed scenarios, of a small, clean reactor are far less than for a D-T fueled larger fusion engine.

Figure 3:
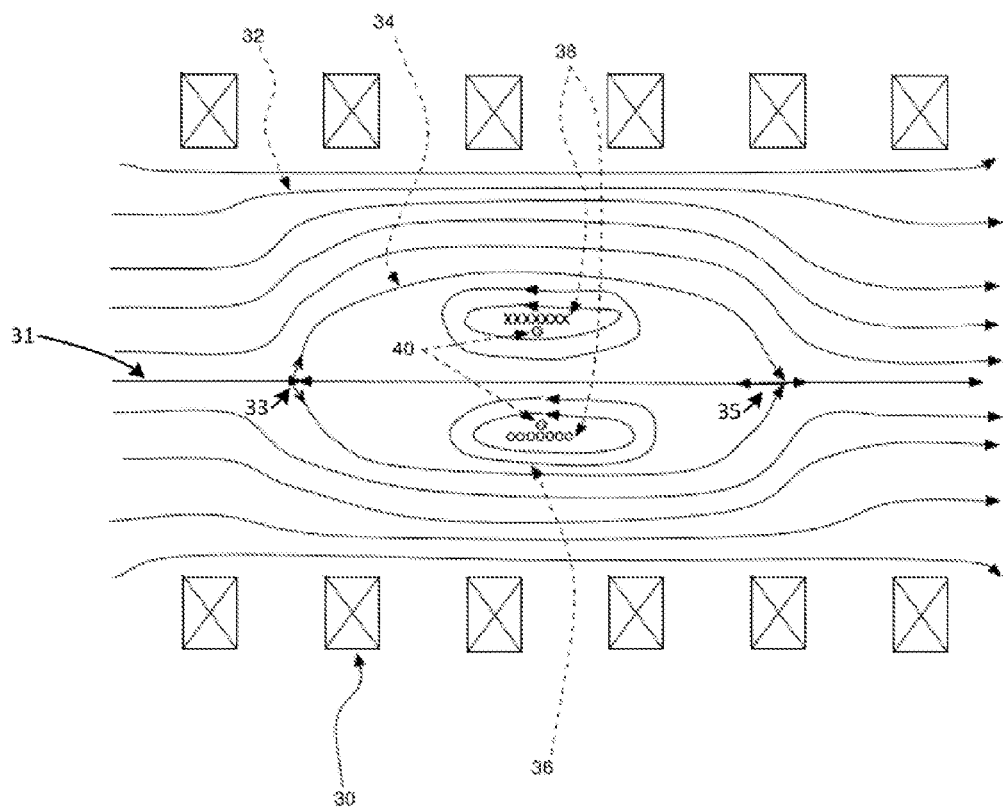
FIG. 3 is a diagram of the FRC's magnetic geometry.

The r-z cross section of a generic FRC is shown schematically in FIG. 3. On the magnetic axis, a circle of a radius $r_o$, measured from the major axis 31 to the O-point 40, in the FRC's midplane, z=0, the magnitude of the magnetic field, |B|, is zero. This null line allows a particular type of rapidly circulating charged-particle trajectory called a betatron orbit, see FIG. 1, an orbit whose curvature reverses direction as it crosses the null. Odd-parity radiofrequency rotating magnetic fields (RMF$_o$) applied to FRC plasmas can heat both electrons and ions and, in doing so, promote their trajectories into shapes called punctuated betatron orbits (PBO), see FIG. 1, wherein the fast betatron orbit is terminated by slowly counter-drifting cyclotron orbits. In an RMF$_o$-heated plasma, the betatron segment of the orbit does not have constant energy. Going from punctuation point to punctuation point, the particle's energy quickly grows and then, just as quickly, decreases. This accel/decel pattern repeats periodically and rapidly, once per RMF$_o$ period. The cause is the RMF$_o$'s (rotating) azimuthal electric field, $\epsilon_\phi$, pointing in opposite directions on opposite sides of the FRC.

Advantageously, the cyclotron segments of the orbits are further removed radially from the null line than are the betatron segments. These cyclotron orbits may be either far inside or far outside $r_o$, as shown FIG. 1. In this plot the particle trajectory, viewed along the major axis, is traced in the frame-of-reference rotating at the RMF$_o$ angular speed, $\omega_{RMF}$.

The betatron segments lie inside the crescent of angular extent $\phi_{PBO}$ created by the cyclotron orbits. This locked behavior shows that PBOs have a time-average azimuthal speed of $\omega_{RMF}r_o$. The spatial separation reduces the frequency of impacts of the fast betatron segments with the slower cyclotron segments. The cause of the radial distillation is the $\epsilon_\phi \times B_z$ radial drift executed by cyclotron orbits, where $B_z$ is the FRC's axial field. The value of a PBO particle's peak azimuthal energy, $W\phi|_{max}$, is approximately proportional to $\zeta \omega_{RMF} B_{RMF} r_o \phi_{PBO}$, where $\zeta$ is the charge on the particle. Accordingly, $^3$He$^{+2}$ will have twice the energy as D$^+$ but, because of $^3$He's greater mass, its peak azimuthal velocity will only be 15% faster than D's.

About 1/3 of the particles will have velocity within 80% of the maximum. The ratio of a betatron-orbit particle's radial to azimuthal energy, $W_r/W_\phi$, will depend on the initial position and velocity of an ion relative to the RMFo's phase. In a scenario, $W_r/W_\phi|_{max} \sim 1/2$ for one PBO. In other scenarios, $W_r/W_\phi \sim 1/3$ is common, though values as small as 1/200 and as large as 1/1 have been seen in simulations. The value of $W_r/W_\phi$ at a collision depends on the azimuthal extent of the PBO crescent, $\phi_{PBO}$, in the RMF frame, its radial excursion, $\Delta r_{PBO}$, and at which point the collision occurs.

Examination of a set of simulations has allowed us to estimate $E_{cm}$ for D$^+$-$^3$He$^{+2}$ collisions due to crossing PBOs. For a 25-cm radius FRC with $B_a$=100 kG and $B_{RMF}$=0.4 kG, the maximum energy attained by D$^+$ and $^3$He$^{+2}$ are 0.4 MeV and 0.8 MeV, respectively. Long-duration trajectory simulations allow us to generate the particle distribution function. We find the $T_{av} \sim 120$ keV from the definition $2E_{av}/3$. Excluding the betatron section of the orbit lowers $T_{av}$ to $\sim 56$ keV. From these considerations, we estimate the collisions of beam-like D-$^3$He will have $E_{cm} \sim 240$ keV while the D-D collisions will have $E_{cm} \sim 140$ keV. In a scenario, the D-$^3$He fusion rate is increased by a factor of 2 above those due to the background plasma temperature while decreasing the D-D-produced neutrons a factor of 0.7. About 5 MW of fusion power would be generated, with a power density over 10 MW/m$^3$, a power in the neutron channel $\sim 0.4\%$ of the total, and a wall loading $\sim 1$ MW/m$^2$.

Recirculating Power: The Rider Criterion

Rider (4 Physics of Plasmas 1039, 1997) has pointed out that a high level of recirculating power, far greater than the fusion power, is required to sustain particle distributions far from Maxwellian, such as the PBOs described above, which would produce enhanced fusion power. The RMF$_o$ method does have high recirculating power, as measured by the electrical Q, about 100, of its antenna circuit. For an absorbed RF power of 2 MW, estimated for a 5 MW net-fusion-power-producing FRC/RMF reactor, the circulating power between the antenna and the RF tank is 200 MW. For beam-enhanced D-$^3$He, Rider estimated that the ratio of recirculating power to fusion power needed must exceed 20 to sustain beam-like ion distributions. The disclosed scenarios satisfies his criterion.

This level of recirculating power pales in comparison with that estimated from the instantaneous acceleration of ions into the betatron segment of the PBOs. The acceleration to $E_{av} \sim 300$ keV occurs for about 10% of the ions in 1 ms. For a 25-cm reactor with $n_i \sim 2 \times 10^{14}$ cm$^{-3}$, the instantaneous power required to accelerate the particles is $6P_i \sim 0.1V \, n_i E_{av} \omega_{RMF} \sim 4 \times 10^{12}$ W. At the same time, however, ions are being decelerating and give nearly the same amount of power back to the RMF antennae. This may be likened to a container holding a gas so tenuous that the gas particles infrequently collide with each other. One wall of the container will experience an outward force; the opposite wall will experience an oppositely directed force. No net energy will be expended maintaining the gas in the container.

During a single RMF period, ca 1 ms, a $^3$He$^{+2}$ ion with energy near 300 keV in a plasma with a D$^+$ density of $2 \times 10^{14}$ cm$^{-3}$ has a probability of $10^{-7}$ for fusing and $10^{-5}$ for undergoing 90° scattering. If the scattered ions are moved out of the crescent, they will no longer gain energy from or lose energy to the RMF. Instead, they will behave like the "classic" hot ion in the two-component method, possibly fusing but more likely heating the lower temperature background plasma. Along this cooling trajectory they may re-enter the crescent. If not, these ions will lose energy predominantly to the electrons, helping to maintain them above the minimum temperature previously noted. Once cooled to the near the average plasma energy, these ions may again be pumped into PBOs.

The FRC geometry is shown in FIG. 3. Field shaping coils 30 create a linear open field region (OFR) 32. The eponymous reverse field region is divided from the OFR by the separatrix 34 and forms a closed poloidal field region (CFR) 36. A toroidal current 38, centered on the O-point null line 40, is formed through the axis of the CFR.

Figure 4:
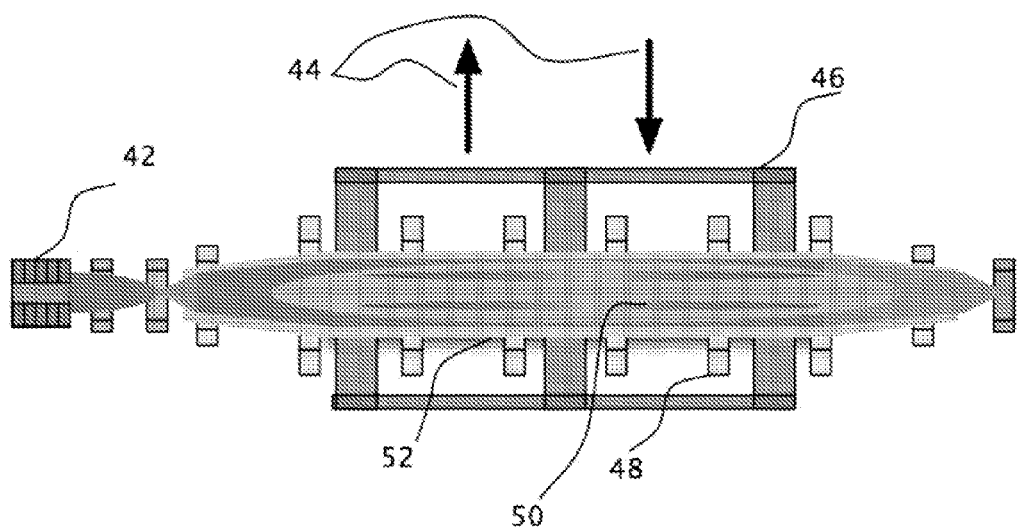
FIG. 4 shows the physical layout of the reactor core of the disclosed scenarios.

The FRC reactor machine is shown in FIG. 4. This diagram shows the critical parts of the reactor core. Fuel is injected 42 and diffuses through the core chamber. The fuel is ionized prior to entry into the FRC. The anti-parallel components of the $RMF_o$ field 44 are created by the RF antennas 46. The direction of the $RMF_o$ is opposite on the two sides of the mid-plane, hence the name odd-parity. The relative phasing of the waveforms going to the antennas arranged around the plasma results in the rotating magnetic field. The RMF waveguides and antennas are shown 46. Radio-frequency waveguides can be of many types and are well-known technology. The antenna is the port for the waveguide carrying the radio-frequency waves. The axial flux coils 48 are passive superconducting coils, in which the rotating plasma induces currents that magnetically confine the plasma. These coils provide magnetic pressure while allowing the $RMF_o$ from external coils to penetrate the plasma. The internal structure of the plasma 50 is shown in FIG. 4 and is defined by the field-reversed configuration. A radiation shield, for reflecting, attenuating, and absorbing, neutrons, Bremsstrahlung, and synchrotron radiation, is shown in 52.

Figure 5:
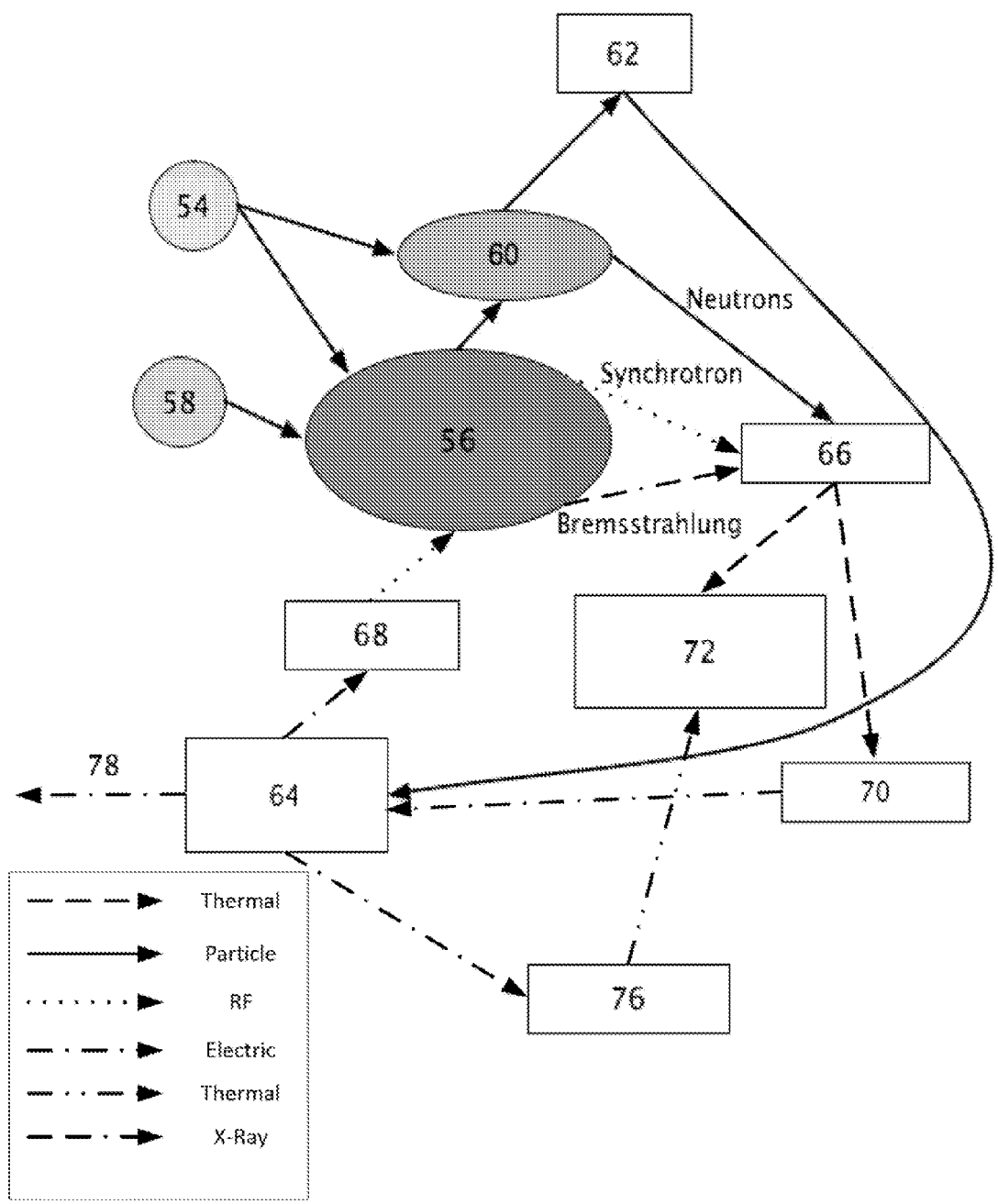
FIG. 5 outlines the energy flow for the disclosed scenarios.

The energy flow is shown in FIG. 5. The diagram shows how energy and particles flow into and out of the reactor. A fuel atom of species 1 ($n_1$) originates in 54 and enters the plasma 56. A second fuel atom ($n_2$) originates in 58 and enters the plasma 56. The fusion reaction 56 converts the reactants into the fusion products and produces power. The reaction also produces Bremsstrahlung x-rays, synchrotron radiation and some neutrons from the D-D side reaction. The ion products pass through the scrape-off-layer 60 and are converted to electricity with through the direct conversion system 62 and exit the system while the power is sent to the power bus 64. The neutrons that are produced in the fusion side reactions hit the shielding wall 66. The plasma 56 is heated by the $RMF_o$ RF heating system 68, which is powered by the power bus 64, produced by either in the heat engine 70 or the direct conversion system 62. The superconducting coils 72 are cooled by the refrigeration system 76. The refrigeration system 76 also runs from the power bus 64. Power is generated from waste heat and x-rays by the heat engine 70. This power can be recirculated to heat the plasma and ionize incoming gas or delivered to the power grid. The shielding wall, 66, absorbs the neutron flux, any emitted synchrotron radiation that is not reflected back into the plasma, and Bremsstrahlung. The refrigeration system 76 cools the superconducting coil 72 and removes waste heat. Only a small portion of the total waste heat is removed by the refrigerator 76. Net power is available from the power bus 78. This power is delivered to the power grid.

Although the scenarios herein has been described with reference to particular embodiments, it is to be understood that these embodiments are merely illustrative of the principles and applications of the disclosed scenarios. It is therefore to be understood that numerous modifications may be made to the illustrative embodiments and that other arrangements may be devised without departing from the spirit and scope of the disclosed scenarios as defined by the appended claims.

The invention claimed is:

1. A field reversed magnetic field configuration fusion reactor system comprising:
   a reactor chamber in a field reversed magnetic field configuration;
   a gas injection system for injecting deuterium and helium-3 fuel into the reactor chamber for fusion reactions;
   a plurality of radio frequency (RF) antennae configured to generate an odd-parity rotating magnetic field capable of causing a plasma to heat to a temperature sufficient to cause fuel ions to fuse to produce fusion products;
   a plurality of superconducting flux coils around the reactor chamber in which an induced current is generated in response to the odd-parity rotating magnetic field, wherein the induced current generates a magnetic confinement field that magnetically confines the plasma; and
   a direct energy conversion system that is configured to extract energy from the fusion products, resulting from fusion reactions in the plasma, that pass through a scrape-off layer.

2. The system of claim 1, wherein power is extracted from Bremsstrahlung radiation and synchrotron radiation generated by the fusion reactions using a heat engine and high temperature heat exchangers.

3. The system of claim 1, wherein the scrape-off layer is configured to allow the fusion products resulting from fusion reactions to pass through before the energy from the fusion products is extracted in the direct energy conversion system.

* * * * *

UNITED STATES PATENT AND TRADEMARK OFFICE
CERTIFICATE OF CORRECTION

| | | |
|---|---|---|
| PATENT NO. | : 9,767,925 B2 | Page 1 of 1 |
| APPLICATION NO. | : 14/387475 | |
| DATED | : September 19, 2017 | |
| INVENTOR(S) | : Samuel A. Cohen | |

It is certified that error appears in the above-identified patent and that said Letters Patent is hereby corrected as shown below:

In the Specification

At Column 1, after Line 13 and before the header "FIELD OF THE INVENTION" insert the following header and sentence therefor:
-- GOVERNMENT LICENSE RIGHTS
This invention was made with Government support under Grant No. DE-AC02-09CH11466 awarded by the Department of Energy. The Government has certain rights in this invention. --

Signed and Sealed this
Eighteenth Day of February, 2020

Andrei Iancu
*Director of the United States Patent and Trademark Office*